Aug. 31, 1943.  F. KUHN ET AL  2,328,152
THERMOSTATIC UNIT AND CONNECTIONS FOR ELECTRIC IRONS
Filed June 23, 1941  2 Sheets-Sheet 1

INVENTORS
FRANK KUHN
LAURENCE H. THOMAS
BY *Whittemore Hulbert & Belknap*
ATTORNEYS Aug. 31, 1943.                F. KUHN ET AL                    2,328,152
              THERMOSTATIC UNIT AND CONNECTIONS FOR ELECTRIC IRONS
                        Filed June 23, 1941          2 Sheets-Sheet 2
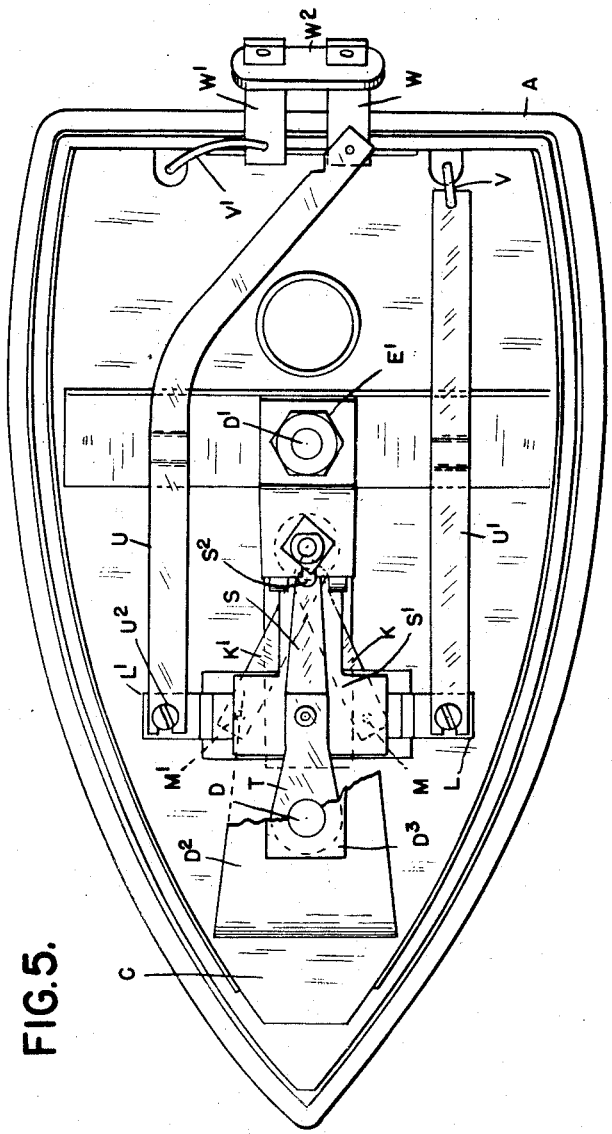
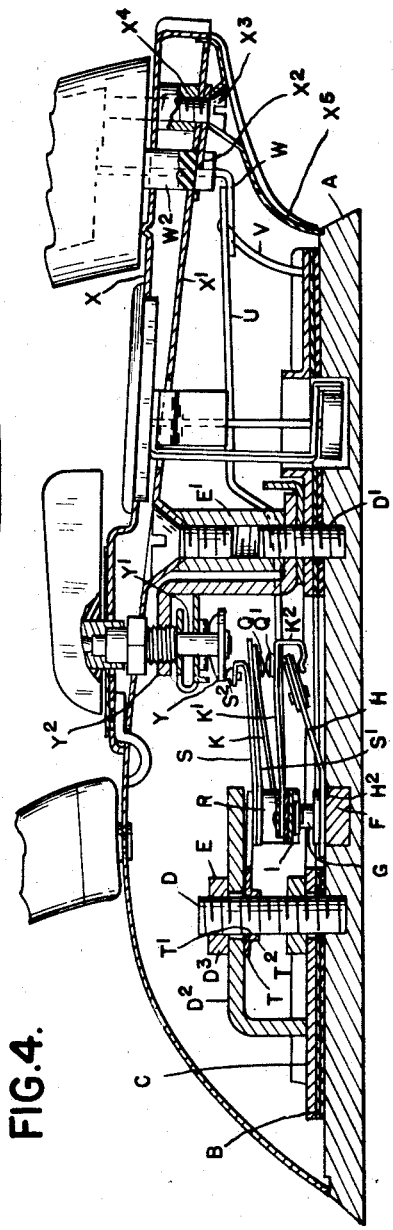
INVENTORS
FRANK KUHN
LAURENCE H. THOMAS
BY *Whittemore Hulbert + Belknap*
ATTORNEYS Patented Aug. 31, 1943

2,328,152

UNITED STATES PATENT OFFICE 2,328,152

THERMOSTATIC UNIT AND CONNECTION FOR ELECTRIC IRONS

Frank Kuhn, Detroit, and Laurence H. Thomas, Birmingham, Mich., assignors to American Electrical Heater Company, Detroit, Mich., a corporation of Michigan Application June 23, 1941, Serial No. 399,414

7 Claims. (Cl. 219—25)

The invention relates to thermostats designed for use in connection with electric laundry irons, and it is the object of the invention to obtain a construction of self-contained thermostatic unit which is easily assembled with the iron and positioned in operative relation thereto.

In the manufacture of electric laundry irons which are thermostatically controlled, difficulty has been experienced in obtaining a thermostat which is both simple in construction and easily mounted on the iron so as to affectively control the temperature of the ironing surface thereof. The sole plate of the iron is usually heated by an electrical heating unit applied to the upper surface thereof and clamped thereagainst by a superposed clamping plate. The thermostatic switch is usually arranged in the chamber within the hood of the iron above the heating unit, but inasmuch as it is the temperature of the bottom of the sole plate or ironing face which is to be controlled, the thermostatic element must be arranged in thermal conductive relation thereto.

One construction that has heretofore been used includes an insert in the sole plate formed of material having high thermal conductivity, the upper end of said insert being in contact with the thermostatic element. Such construction also includes a refractory insulator block on which the electrically conductive elements of the switch are mounted and which holds the same in operative relation to the thermostatic element. It has been found that these refractory insulator blocks are quite fragile, requiring care and skill in the assembly of the parts.

To overcome the difficulties just described, we have devised a construction of self-contained thermostatic switch unit employing non-fragile materials and holding the several elements thereof in operative relation to each other. We have also simplified the connections between this unit, the electrical heating unit and the external circuit, and have facilitated the assembly and positioning of the several parts within the iron. Our invention, therefore, consists in various features of construction as hereinafter more fully set forth.

In the drawings:

Fig. 4 is a longitudinal section through a laundry iron provided with the thermostatic switch unit; and Fig. 5 is a plan view of the iron with the hood removed, illustrating the arrangement of the switch unit and its electrical connections.

The laundry iron may be of any suitable construction including a sole plate A, an electrical heating unit B, and a clamping plate C for holding the unit against the upper face of the sole plate. The clamping is effected by a pair of threaded studs D and D', extending upward from the sole plate through apertures in the heating unit and clamping plate, together with nuts E and E' engaging said studs. F is an insert formed of metal, such as copper, having high thermal conductivity, and located in a recess in the sole plate extending from near the bottom to the top face thereof. This insert is located somewhat in advance of the longitudinal center of the sole plate and in the central plane thereof. Above this insert and extending to the rear thereof are registering slots in the heating unit B and clamping plate C. These slots are adapted to receive our improved thermostatic switch unit which is of the following construction.

Figure 1:
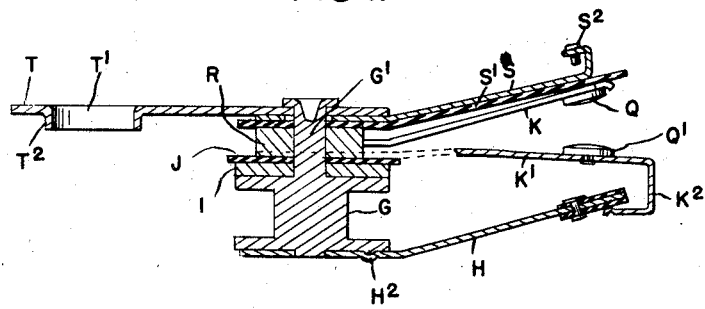
Fig. 1 is an enlarged longitudinal section through the thermostatic switch unit.
Figure 2:
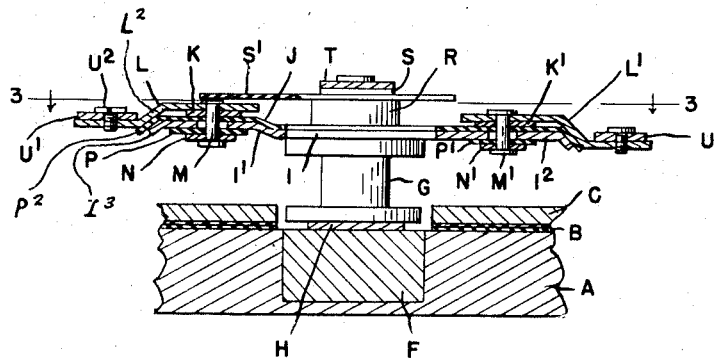
Fig. 2 is a cross section thereof.
Figure 3:
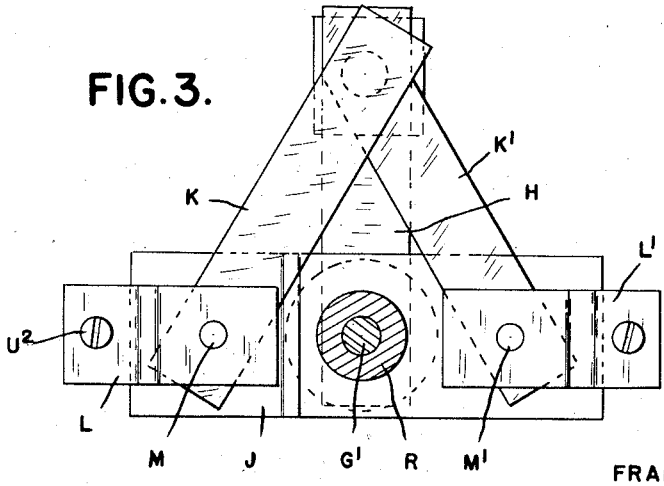
Fig. 3 is a horizontal section on line 3—3 of Fig. 2.

G is a post adapted to be seated on the insert F and having secured to its bottom face, preferably by welding, a thermostatic bar H extending rearward and inclining upward therefrom. I is a cross bar mounted on the upper portion of the post G and extending upon opposite sides thereof. One side I' of this bar is upwardly offset to be in a slightly higher plane than the opposite side I², and the upper faces of both sides are covered with insulating material J, preferably mica. K and K' are resilient flexible conductor strips, respectively mounted on the sides I' and I² and extending rearward therefrom in obliquely inclined relation to each other, so that their free ends are superposed. L and L' are metallic members arranged above and extending laterally outward from the conductor strips K and K'. These members are secured to the cross bar I, but insulated therefrom preferably by means of rivets M and M' passing through enlarged apertures in said bar and engaging lower clamping plates N and N' insulated from the bar by mica strips P and P'. The members L and L' are also preferably offset to form inclined shoulders L² separated by the insulator strip P² from correspondingly inclined shoulders I³ at the ends of the cross bar I, as shown in Fig. 2. These shoulders together with the clamping rivets M and M' serve to hold the members L and L' rigidly positioned on the bar I but insulated therefrom. Near the free ends of the strips K and K' are contacts Q and Q', which are in registration with each other. The cross bar I is preferably clamped upon the post G by an upward extension G' of the latter, passing through an aperture in the bar and a spacer R above the same. Seated on this spacer and extending rearward to a point above the registering portions of the strips K and K' is a resilient strip S. This is biased to incline slightly upward and is separated from the upper conductor strip K by an insulator strip S' which is preferably of a T-shape form, having lateral portions extending over the members L and L'. T is a member above the members S and S' apertured to engage the portion G' of the post and to extend rearward therefrom, being provided at its rear end with an aperture T' and a downturned flange T² surrounding the same. All of these parts are secured to each other and to the post by riveting over the upper end of the portion G', as shown in Fig. 1. Thus, the free ends of the thermostatic bar H, conductor strips K and K' and resilient strip S are all in registration, and are held in such arrangement by their rigid attachment to the post G and cross bar I. The resilient conductor strips K and K' are biased to move upward, but the upward movement of the strip K is limited by contact with the strip S, so that the contacts Q and Q' will be pressed together. The lower conductor strip K' has a hook portion K² which passes around the end of the thermostatic bar H and beneath mica insulation H' thereon. Thus, under rise in temperature, the bar H will warp downward, carrying with it the strip K' and separating the contact Q' from the contact Q. The whole assembly forms an organized thermostatic switch unit which is separable from the other parts of the electric iron.

The thermostatic switch just described is positioned in operative relation to the electric iron by engaging the aperture T' of the forwardly extending member T with an upwardly projecting portion of the stud D. This brings the base of the post and the attached portion of the thermostatic bar H in registration with the upper face of the insert F in the sole plate A. There is also preferably a point H² projecting from the bar H and engaging a corresponding recess in the member F to hold the post and insert in lateral registration. The post is then clamped down upon the insert, preferably by means of a member D² apertured to be sleeved on the stud D with its rear end bearing against the top of the post G and with its forward end turned downward to rest and fulcrum upon the clamping plate B. A nut D³ on the stud is tightened to force the member D² downward, thereby tightly clamping the post G upon the insert.

As has been stated, the insert F is located forward of the longitudinal center of the sole plate, whereas the electrical contacts for connection with the external circuit, as well as the terminals of the heating resistor, are, as usual, located at the rear of the iron.

To complete the electric circuit, including the thermostatic switch, conductor strips U and U' are connected, respectively, to the outer ends of the members L and L' by clamping screws U². These strips extend rearward and are sufficiently rigid to be sustained above the sole plate. The rear end of the strip U' is attached to one terminal V of the heating resistor. The strip U has an obliquely extending rear portion which is connected with one of the terminal contacts W for the external circuit. The other contact W' is connected with the opposite terminal portion V' of the heating resistor, and both contacts engage an insulator block W². This block is normally located in an aperture in the hood of the iron and, as shown, engages apertures in the spaced walls X and X' of the hood, which form an insulating air chamber therebetween. The block W² is sustained in this position by a finger X² clamped to the wall X' by a screw X³ engaging a threaded socket X⁴, said screw also holding a rear closure plate X⁵ for the hood. This construction facilitates assembly, as the terminal contacts W, W', and insulator block W² are held in position by the strip U, so that the aperture in the hood will register therewith when the latter is placed over the sole plate. The finger X² and closure plate X⁵ are then secured by the clamping screw X³. As the specific construction of the hood and the handle attached thereto does not form any part of the subject matter of this invention, it will not be further described or illustrated.

It is usual to provide means for adjusting the thermostatic switch so as to hold different temperatures in the sole plate of the iron suitable for different kinds of work. The adjustment means comprises a cam Y mounted on a rotary shaft Y', which is journaled in a bracket Y² mounted on the sole plate. The cam engages a bearing S² on the outer end of the resilient flexible strip S, so that by rotating the shaft Y', this strip, together with the flexible conductor strip K and contact Q, will be depressed. In order to properly register the cam with the bearing S², the bracket Y² is positioned by engaging an apertured base portion thereof with the stud D' and then securing it by the clamping nut E'. Thus together the studs D and D', which are standard portions of the electric iron, serve to secure and properly position the thermostatic switch assembly and its adjusting means in relation to each other.

What we claim as our invention is:

1. The combination with an electrically heated member, of a thermostatic switch unit assembly comprising a rigid straight post, a cross bar centrally and rigidly mounted on said post, resilient conductor strips having an insulated mounting on the opposite end portions of said bar and extending obliquely therefrom with their free ends in registration, cooperating contacts upon the registering ends of said strips, a thermostatic bar rigidly secured to the base of said post and inclining upward therefrom, an insulated connection between the free end of said thermostatic bar and the lower resilient conductor strip, electrical connections between said resilient strips and said electrically heated member, and means bearing upon the upper end of said post for clamping the same in thermal conductive relation to said electrically heated member.

2. A thermostatic switch assembly comprising a rigid straight post, a cross bar centrally and rigidly mounted thereon having its opposite end portions in spaced parallel planes, resilient conductor strips mounted on said outer portions and insulated therefrom, said strips extending obliquely with their free ends in registration, cooperating contact members on said registering ends, a thermostatic bar rigidly secured to the base of said post and inclining upward therefrom, a hooked insulated connection between the free end of the lower resilient strip and said thermostatic bar, members electrically connected to said resilient strips having an insulated rigid mounting on said bar and extending outward therefrom, said members being adapted for connection into the electric circuit controlled by said switch, and means engaging and bearing upon the upper end of said post for clamping the same with its base in thermal conductive relation to a member whose temperature is to be controlled.

3. The combination with a laundry iron provided with an electrically heated sole plate and an insert in said sole plate of high thermal conductivity, of a thermostatic switch assembled unit comprising a rigid straight post, a cross bar centrally and rigidly mounted on said post, resilient conductor strips having an insulated mounting on the opposite end portions of said cross bar and extending therefrom obliquely with their free ends in registration, cooperating contacts on the free ends of said strips, a thermostatic bar rigidly secured to the base of said post and inclining upward therefrom, a hooked insulated connection between the free ends of said thermostatic bar and the lower of said resilient strips, a member rigidly secured to the upper end of said post and extending rearwardly therefrom with an aperture in its rear end and means secured to said sole plate and engaging the upper end of said post for attaching said unit and clamping the base thereof and said thermostatic bar against said insert said clamping means including a threaded stud rising from said sole plate and passing through the aperture in said rearwardly extending member, a plate also apertured to engage said stud and projecting forward to bear upon said post, and a nut engaging said threaded stud for drawing down on said plate.

4. The combination with a laundry iron having a sole plate, an electric heating unit above the same, a plate above said unit, a threaded stud projecting upward from said sole plate through registering apertures in said unit and plate, a nut engaging said post for clamping said plate and unit to said sole plate, and an insert in said sole plate of high thermal conductivity in alignment with registering apertures in said unit and clamping plate; of a thermostatic switch assembly comprising a post, a cross bar centrally mounted on said post, resilient conductor strips having an insulated mounting on opposite end portions of said cross bar and extending therefrom with their free ends in registration, cooperating contacts on the registering ends of said strips, a thermastatic bar secured to the base of said post and inclining upward therefrom, an insulated operating connection between the free ends of said thermostatic bar and the lower resilient strip, an arm secured to said post extending oppositely from said strips and apertured at its outer end to engage said threaded stud, thereby positioning the base of said post in alignment with said insert, a plate engaging the upper end of said post and sleeved upon said threaded stud, and a nut on said threaded stud for clamping said plate against said post and the base of the latter and said thermostatic bar against said insert.

5. The combination with a laundry iron provided with a sole plate, an electric heating unit above the same, an upper plate above said heating unit, a threaded stud extending upward from said sole plate through registering apertures in said unit and plate, a nut on said stud for clamping said upper plate and unit against said sole plate; of a thermostatic switch assembly comprising a post, a cross bar centrally mounted on said post, resilient conductor strips having an insulated mounting on the opposite end portions of said cross bar and extending obliquely with their free ends in registration, cooperating contacts on the registering ends of said strips, a thermostatic bar secured to the base of said post and inclining upward therefrom, an insulated operating connection between the free ends of said thermostatic bar and lower resilient strip, a member projecting from the central portion of said post apertured at its outer end to be sleeved on said threaded stud and to thereby position said post in relation to said sole plate, a plate engaging the upper end of said post, a nut on said threaded stud engaging said last-mentioned plate and clamping the same against said post to hold the base of the latter and said thermostatic bar against said sole plate, a conductor bar mounted on said cross bar to be insulated therefrom and electrically connected to one of said resilient strips, and a pair of terminal contacts for the electric iron supported by said bar and one being electrically connected therewith, said contacts being positioned by said bar in relation to said iron.

6. The combination with a laundry iron comprising a sole plate, an electric heating unit above the same, an upper plate above said unit, spaced threaded studs extending upward from said sole plate through aligned apertures in said unit and upper plate, and nuts engaging said threaded studs for clamping said upper plate and unit to said sole plate; of a thermostatic switch assembly comprising a post, a cross bar centrally mounted thereon, resilient conductor strips having an insulated mounting on opposite end portions of said cross bar and extending obliquely therefrom with their free ends in registration, cooperating contacts on the registering ends of said strips, a thermostatic bar secured to the base of said post and inclining upward therefrom, an insulated connection between the free ends of said thermostatic bar and the lower of said resilient strips, adjusting means for said thermostatic switch including a cam for depressing the upper resilient strip, and members respectively connected to the post of said thermostatic switch and said adjusting means and also respectively engaging said threaded studs, said members forming positioning means for the members connected therewith in relation to each other and to the laundry iron.

7. A thermostatic switch assembled unit comprising a post, a cross bar centrally and rigidly mounted thereon having its opposite end portions in spaced, parallel planes, insulator strips above and below said portions, resilient conductor strips mounted on the upper insulator strips and extending obliquely therefrom with their free ends in registration, cooperating contact members on said registering ends, conductor members above said resilient conductor strips in electrical contact therewith, each member being also offset to form a shouldered engagement with the end of said bar and an insulator strip thereover, a single rivet connecting said member and resilient strip to said bar and in connection with said shouldered engagement holding the same rigidly positioned, a thermostatic bar secured to the base of said post and inclining upwardly therefrom, a hooked insulated connection between the free end of the lower resilient strip and said thermostatic bar, and means engaging the upper end of said post for securing said unit with the base of said post and the thermostatic bar clamped in thermo-conductive relation to a member whose temperature is to be controlled.

FRANK KUHN.
LAURENCE H. THOMAS.